United States Patent [19]
Howard

[11] Patent Number: 6,063,271
[45] Date of Patent: May 16, 2000

[54] PORTABLE WASTE WATER TREATMENT PLANT

[76] Inventor: Russell J. Howard, P.O. Box 1593, Denham Springs, La. 70727

[21] Appl. No.: 09/104,564

[22] Filed: Jun. 25, 1998

[51] Int. Cl.⁷ .................................................. B01D 35/18
[52] U.S. Cl. .......................... 210/177; 210/187; 210/220; 210/241; 210/532.2
[58] Field of Search ..................................... 210/177, 187, 210/202, 220, 258, 612, 620, 241, 532.2

[56] References Cited

U.S. PATENT DOCUMENTS

| | | | |
|---|---|---|---|
| Re. 32,312 | 12/1986 | Crates et al. | 210/532.2 |
| 2,974,800 | 3/1961 | Fleischmann | 210/177 |
| 3,109,813 | 11/1963 | Bergsten et al. | 210/532 |
| 3,741,393 | 6/1973 | Estes et al. | 210/195 |
| 3,821,107 | 6/1974 | Peoples | 210/612 |
| 3,824,186 | 7/1974 | Erickson et al. | 210/672 |
| 3,904,524 | 9/1975 | Pelton et al. | 210/94 |
| 4,278,545 | 7/1981 | Batutis et al. | 210/521 |
| 4,325,823 | 4/1982 | Graham | 210/86 |
| 4,406,790 | 9/1983 | Birkner | 210/177 |
| 4,693,816 | 9/1987 | Salokangas | 210/177 |
| 4,859,325 | 8/1989 | Cormier | 210/195.3 |
| 4,885,094 | 12/1989 | Srinivasan et al. | 210/612 |
| 4,940,539 | 7/1990 | Weber | 210/187 |
| 4,997,562 | 3/1991 | Warner | 210/259 |
| 4,999,103 | 3/1991 | Bogart | 210/241 |
| 5,441,632 | 8/1995 | Charon | 210/187 |
| 5,569,376 | 10/1996 | Graves | 210/195.4 |
| 5,800,705 | 9/1998 | Downs | 210/177 |

FOREIGN PATENT DOCUMENTS

| | | |
|---|---|---|
| 2607490 | 6/1988 | France . |
| 2-222784 | 9/1990 | Japan . |

*Primary Examiner*—Christopher Upton
*Attorney, Agent, or Firm*—David L. Ray

[57] ABSTRACT

A multi-chambered portable waste water treatment plant for a mobile home which is installed on or above ground level and can be easily moved from one location to another. The portable waste water treatment plant of the invention is insulated and is internally heated to prevent freezing of the liquids in the plant and promote decomposition of the waste in the plant when ambient temperatures are below freezing.

6 Claims, 3 Drawing Sheets

PORTABLE WASTE WATER TREATMENT PLANT

BACKGROUND OF THE INVENTION

1. Field of the Invention

The present invention relates to waste water treatment plants such as septic tanks. In particular, the invention relates to waste water treatment plants useful for mobile homes.

2. Description of the Related Art

Owners of mobile homes commonly have to install a waste water treatment plant at the location at which they place their mobile home. Such waste water treatment plants are commonly quite expensive to install. When the owner of the mobile home moves the mobile home to another location, the waste water treatment plant cannot be easily moved to the new location because the waste water treatment plant is permanently buried in the ground. Therefore, the owner of the mobile home must incur the additional expense of purchasing another waste water treatment plant and installing the waste water treatment plant at the new location.

There is a need for a waste water treatment plant that can be easily removed from a mobile home location and moved to a new location of the mobile home.

Exemplary of the Patents of the related art are the following U.S. Pat. No. Re 32,313; U.S. Pat. Nos. 3,109,813; 3,741,393; 3,904,524; 4,278,545; 4,325,823; 4,859,325; 4,997,562; and 5,569,376.

SUMMARY OF THE INVENTION

In accordance with the present invention there is provided a multi-chambered portable waste water treatment plant which is installed above ground and can be easily moved from one location to another. The portable waste water treatment plant of the invention is insulated and is internally heated to prevent freezing of the liquids in the plant and promote decomposition of the waste in the plant when ambient temperatures are below freezing.

DESCRIPTION OF THE PREFERRED EMBODIMENTS

Figure 1:
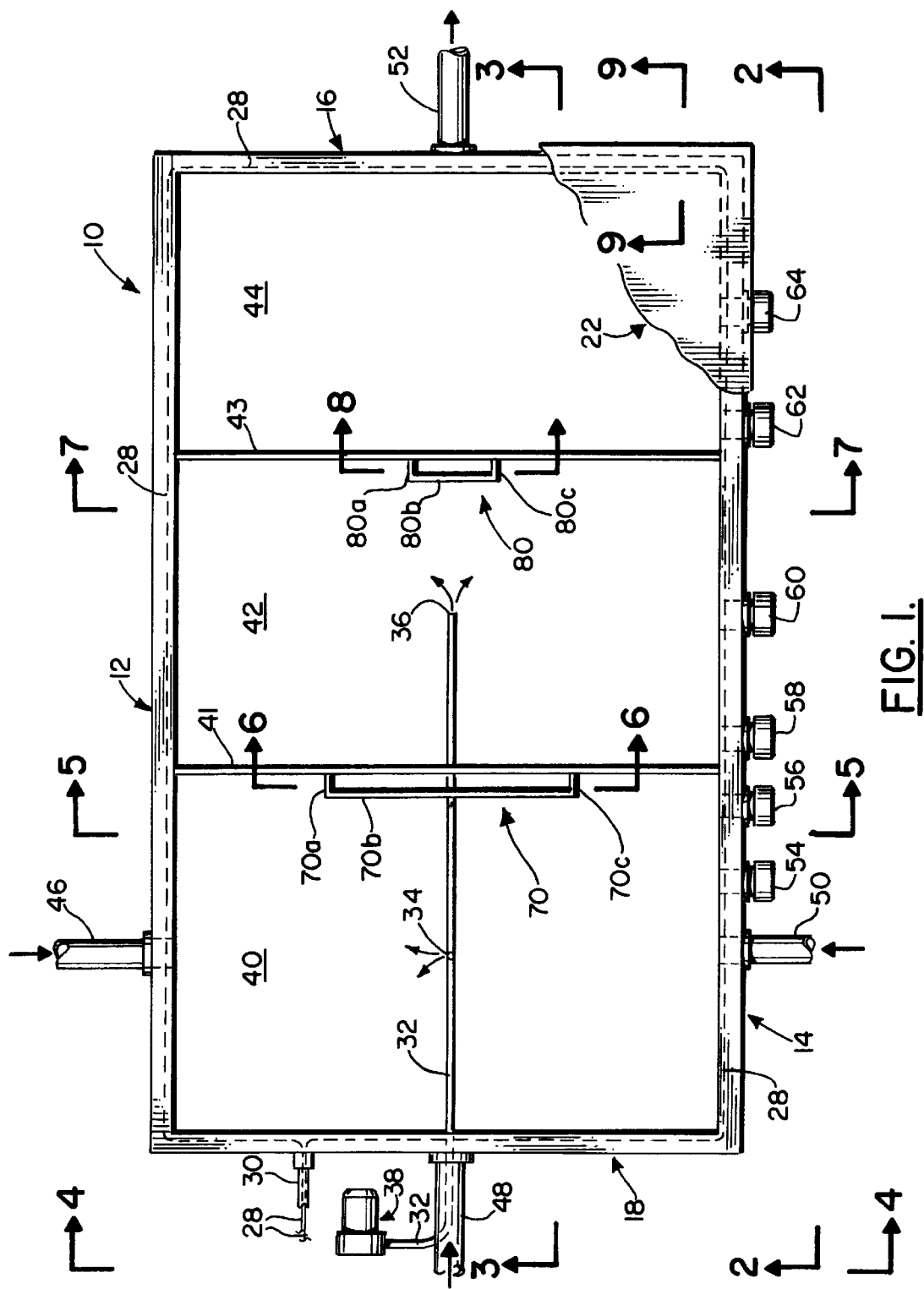
FIG. 1 is a schematic top plan view, with the top partly cut-away, of the portable waste water treatment plant of the invention.
Figure 3:
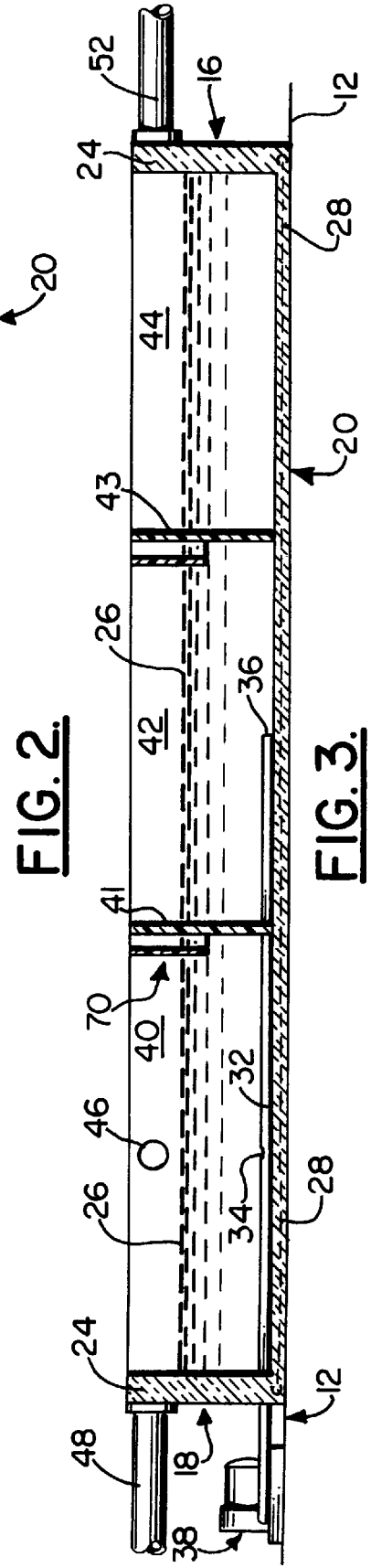
FIG. 3 is an elevational view taken along lines 3—3 of FIG. 1 with the top of the plant removed.
Figure 4:
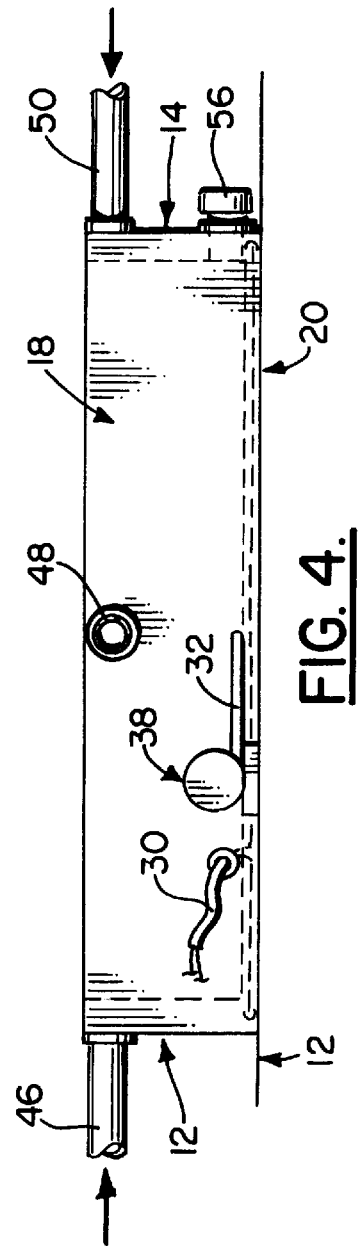
FIG. 4 is an elevational view taken along lines 4—4 of FIG. 1 with the top of the plant removed.
Figure 5:
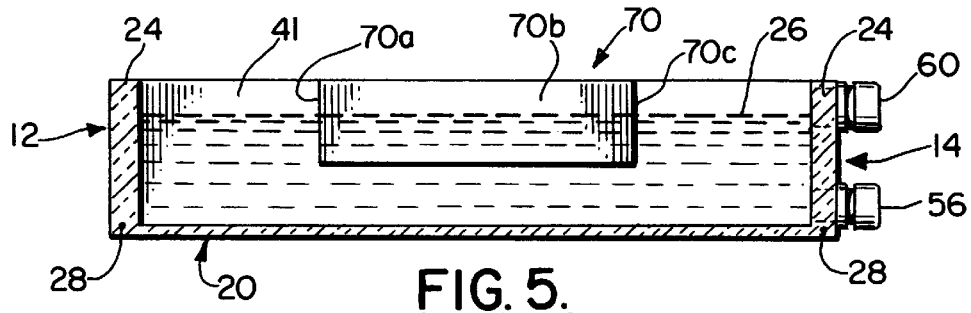
FIG. 5 is an elevational view taken along lines 5—5 of FIG. 1 with the top of the plant removed.

Referring now to the drawings, in FIG. 1 is shown the portable waste water treatment plant, or portable septic tank, of the present invention generally indicated by the numeral 10. Portable waste water treatment plant 10 sits on the surface of the ground generally indicated by the numeral 12 in FIGS. 3 and 4 and may be placed on the ground 12 underneath a mobile home for treating waste water produced by a mobile home. When the mobile home is moved, the portable waste water treatment plant 10 can also be easily moved since it is not buried permanently in the ground.

As can be seen in the drawings, the waste water treatment plant 10 has a generally rectangular multi-chambered tank having side walls generally indicated by the numerals 12 and 14 and end walls generally indicated by the numerals 16 and 18 which are rigidly connected to the rectangular bottom generally indicated by the numeral 20. A rectangular top generally indicated by the numeral 22 fits over and covers the side walls 12 and 14 and the end walls 16 and 18 to contain gases generated by decaying waste within plant 10.

Figure 6:
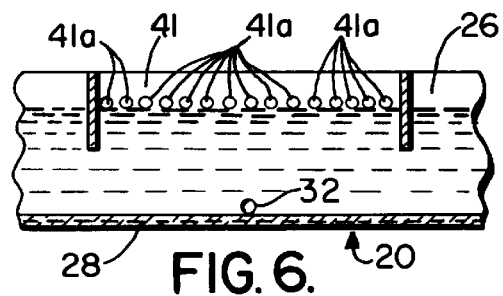
FIG. 6 is a partly cut-away elevational view taken along lines 6—6 of FIG. 1 with the top of the plant removed.
Figure 7:
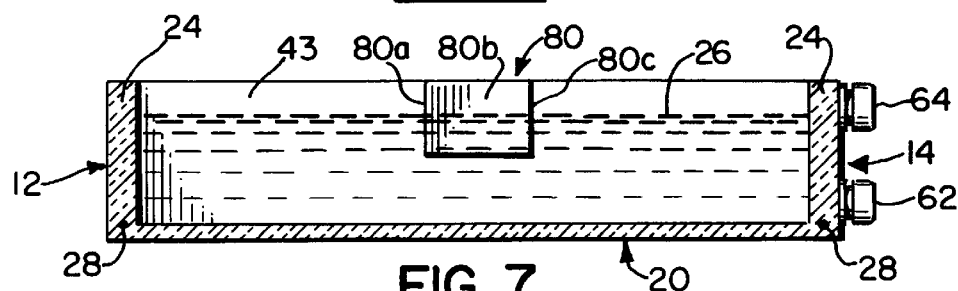
FIG. 7 is an elevational view taken along lines 7—7 of FIG. 1 with the top of the plant removed.
Figure 8:
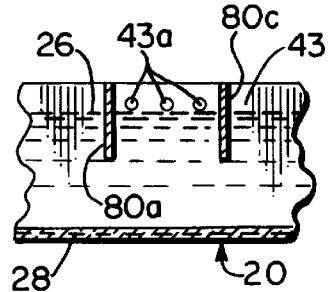
FIG. 8 is a partly cut-away elevational view taken along lines 8—8 of FIG. 1 with the top of the plant removed.

Since the portable waste water treatment plant 10 can be located above the surface of the ground rather than being buried in the ground, the side walls 12 and 14, the end walls 16 and 18, the bottom 20, and the top 22 have an inner insulating material 24 therein to prevent the liquids 26 in the interior of the plant 10 from freezing when ambient temperatures fall below 32° F. Preferably, insulating material 24 is a material such as Styrofoam® or the like, although any conventional insulating material may be used. Preferably, insulating material 24 is covered on each side by a rigid skin material such as is indicated by the numerals 16a, 20a and 22a in FIG. 6. The rigid skin material is preferably a reinforced polymeric material reinforced with a material such as glass fibers, although metals such as aluminum could also be used as the skin material 16a, 20a, and 22a.

To further prevent freezing of the liquids in the portable waste water treatment plant 10 of the invention when ambient temperatures fall below 32° F., heat is supplied to plant 10, in addition to insulation of the top, bottom, and exterior walls. In addition to preventing freezing of the liquids in portable waste water treatment plant 10, heating of plant 10 insures that the decomposition of the waste in portable waste water treatment plant 10 continues despite freezing ambient temperatures, and the temperature of the interior of the portable waste water treatment plant 10 can be regulated as desired to achieve the optimum rate of decomposition of the waster therein. If desired, a thermostat may be installed inside of portable waste water treatment plant 10 to maintain the interior of the plant 10 at a minimum desired temperature.

Heating is provided through electrical heating wire or strip 28 which is located within the outer edges of bottom 20. If desired, the entire bottom 20 could contain heat strips 28 if more heat is desired. Heat strip 28 is connected to flexible wire cover 30 shown in FIG. 1, which is connected to a source of electrical energy (not shown) such as a 120 volt alternating current energy source.

The preferred embodiment of portable waste water treatment plant 10 has three chambers generally indicated by the numerals 40, 42, and 44 for holding waste liquids discharged from a mobile home while the liquids are being detoxified and treated to meet local waste water discharge laws. Chambers 40 and 42 are separated by vertical wall 41, and chambers 42 and 44 are separated by vertical wall 43. If desired, fewer than three chambers, or more than three chambers could be employed.

Waste liquids are treated in portable waste water treatment plant 10 by aerating the waste liquids as is known in the art. The waste liquids in chambers 40 and 42 are provided with air from pipe 32. Air exits from pipe 32 at hole 34 and the open end 36 of pipe 32 as indicated by the arrows in FIG. 1 and bubbles upward through the waste in plant 10. Air is supplied to pipe 32 by the air pump generally indicated by the numeral 38.

Figure 9:
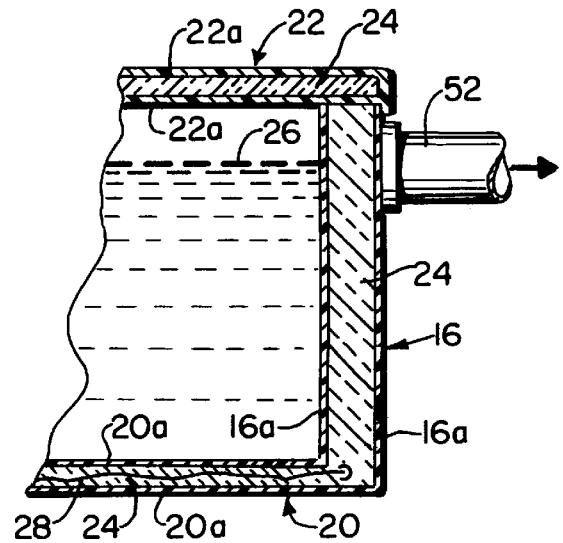
FIG. 9 is a partly cut-away elevational view taken along lines 9—9 of FIG. 1 with the top of the plant removed.

Untreated waste liquids flow into portable waste water treatment plant 10 through one or more of the inlet pipes 46, 48, and 50 in the direction indicated by the arrows in FIG. 1, and treated waste liquids and gases are discharged through discharge pipe 52 in the direction indicated by the arrow in FIGS. 1 and 9. Discharge pipe 52 is connected to conventional field lines (not shown) well known in the art to disperse the treated waste liquids and gases in a drain field as is well known in the art.

Pipes 46, 48 and 50 may be connected to the liquid discharge lines of any desired combination of water using appliances such as washing machines, dishwashers, and the like, or to lavatories, sinks, toilets, and bathtubs. For example, pipe 46 may be connected to the lavatory, bathtub, and sink discharge pipes, pipe 48 may be connected to toilet discharge pipes, and pipe 50 may be connected to dishwasher and washing machine discharge lines. If desired, all waste water discharge lines from a mobile home could flow into a single pipe such as pipe 48, and pipes 46 and 50 could be omitted.

Figure 2:
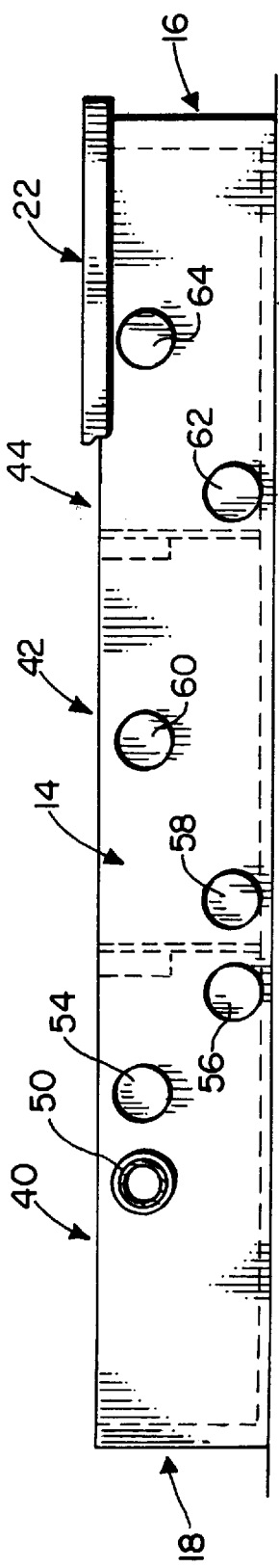
FIG. 2 is an elevational view of one side of the portable waste water treatment plant of the invention, with the top of the plant partly cut-away, taken along lines 2—2 of FIG. 1.

As can best be seen in FIG. 2, there are a series of short pipes and cap assemblies 54, 56, 58, 60, 62 and 64 extending from the inside to the outside of side wall 14 which may be used for to accomplish a variety of different tasks. The short pipes and cap assemblies could be used, after removal of a cap associated with the pipe, for cleaning sludge and sediment from the inside of portable waste water treatment plant 10, for inspecting the inside of the portable waste water treatment plant 10, for installation of a sight glass to view the interior of portable waste water treatment plant 10, or for connecting another waste water inlet pipe portable waste water treatment plant 10.

Waste liquids entering chamber 40 through inlet pipes 46, 48, and/or 50 are contained in chamber 40 while air is being bubbled therethrough from hole 34 in line 32 to aerate and purify the waste liquids in chamber 40. Waste liquids in chamber 40 flow from chamber 40 into chamber 42 through a plurality of hollow cylindrical passages 41*a* in vertical wall 41 when the level of liquids 26 in chamber 40 rises to the height of passages 41*a*. Sediment from the waste liquids treated in chamber 40 settles to the bottom of chamber 40 and may be cleaned out of portable waste water treatment plant 10 when and if necessary.

Waste particles floating on the top of the liquids in chamber 40 are prevented from entering passages 41*a* and possibly stopping the flow of liquids therethrough by the waste box generally indicated by the numeral 70. Waste box 70 is formed from two side walls 70*a* and 70*b*, which are rigidly connected to vertical wall 41, and wall 70*b*, which is rigidly connected to the edge of each of the side walls 70*a* and 70*b*. Waste box 70 is open at the top and the bottom, and extends to the top of vertical wall 41 and downward to any desired level beneath the bottom of passages 41*a*. Thus, waste floating on top of the liquid in chamber 40 will strike the outside of waste box 70 and be prevented from flowing into and clogging passages 41*a*.

Treated liquids from chamber 40 flowing through passages 41*a* enter chamber 42 and are contained therein for further aeration. Air exiting from the end 36 of pipe 32 is bubbled upward through the waste liquids in chamber 42 to further aerate and purify the waste liquids therein. Waste liquids in chamber 42 flow from chamber 42 into chamber 44 through a plurality of hollow cylindrical passages 43*a* in vertical wall 43 when the level of liquids 26 in chamber 42 rises to the height of passages 43*a*. Sediment from the waste liquids treated in chamber 42 settles to the bottom of chamber 42 and may be cleaned out of portable waste water treatment plant 10 when and if necessary.

Waste particles floating on the top of the liquids in chamber 42 are prevented from entering passages 43*a* and possibly stopping the flow of liquids therethrough by the waste box generally indicated by the numeral 80. Waste box 80 is formed from two side walls 80*a* and 80*b*, which are rigidly connected to vertical wall 43, and wall 80*b*, which is rigidly connected to the edge of each of the side walls 80*a* and 80*b*. Waste box 80 is open at the top and the bottom, and extends to the top of vertical wall 43 and downward to any desired level beneath the bottom of passages 43*a*. Thus, waste floating on top of the liquid in chamber 42 will strike the outside of waste box 80 and be prevented from flowing into and clogging passages 43*a*.

The method of the present invention for treating waste water discharge from a mobile home includes installing a portable, multi-chambered tank on or above the level of the ground for receiving waste liquids from a mobile home, introducing air into waste liquids contained in the tank for aerating the waste liquids to promote decomposition of said waste in the waste liquids in tank, and providing heat to the multi-chambered tank to heat the waste liquids in the tank to prevent freezing of the waste liquids in the tank when ambient temperatures are below 32° F.

Although the preferred embodiments of the invention have been described in detail above, it should be understood that the invention is in no sense limited thereby, and its scope is to be determined by that of the following claims:

What is claimed is:

1. A movable, insulated, heatable, waste water treatment plant for mobile homes for promoting decomposition of waste liquids contained therein, said waste water treatment plant being installable above ground and being easily transportable with a mobile home when said mobile home is moved from one location to another, the plant comprising:

a. a portable, multi-chambered tank located above the level of the ground and beneath said mobile home for receiving waste liquids by gravity flow from said mobile home, said tank being easily transportable with a mobile home when said mobile home is moved from one location to another, said tank having four vertical walls, a bottom, and a top, said four vertical walls, said bottom, and said top having an insulating sheet material connected to the inside thereof, said insulating sheet material having a rigid skin material connected to the inside surface thereof which is exposed to said waste liquids, b. a pipe connected to said tank for introducing air into said waste liquids contained in said tank for aerating said waste liquids to promote decomposition of said liquids in said tank, and c. a heater connected to said multi-chambered tank for heating the waste liquids in said tank to prevent freezing of the liquids contained in said tank when ambient temperatures are below 32° F.

2. The waste water treatment plant of claim 1 wherein said plant has three chambers.

3. The waste water treatment plant of claim 2 wherein said tank has an inlet pipe for conveying untreated waste liquids to said tank and a discharge pipe for conveying treated liquids from said tank.

4. The waste water treatment plant of claim 3 wherein said tank has two vertical walls therein which divide said tank into said three chambers.

5. The waste water treatment plant of claim 4 wherein said two vertical wall have passages therein for permitting liquids and gases therein to flow from one of said chambers to the next of said chambers.

6. The waste water treatment plant of claim 1 wherein said skin material is a polymeric material.

* * * * *